June 13, 1939.  E. A. HEATH  2,162,400
REMOVABLE MOTOR MOUNT AND ADAPTER FOR MIXERS, CHURNS, AND THE LIKE
Filed Aug. 26, 1936  2 Sheets-Sheet 1
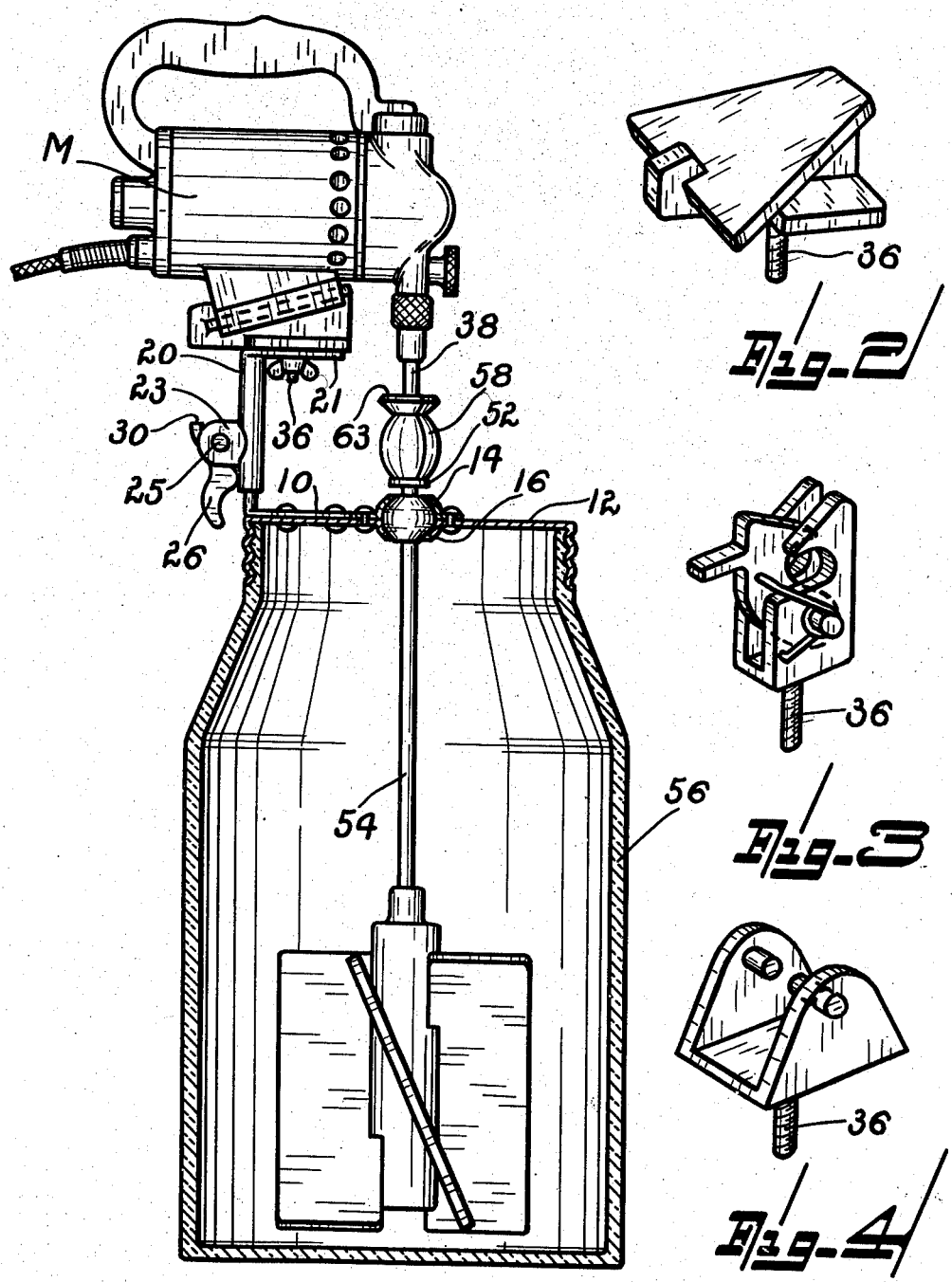
INVENTOR
Emery A. Heath
BY
Smith & Tuck
ATTORNEYS June 13, 1939.　　　　E. A. HEATH　　　　2,162,400
REMOVABLE MOTOR MOUNT AND ADAPTER FOR MIXERS, CHURNS, AND THE LIKE
Filed Aug. 26, 1936　　　2 Sheets-Sheet 2
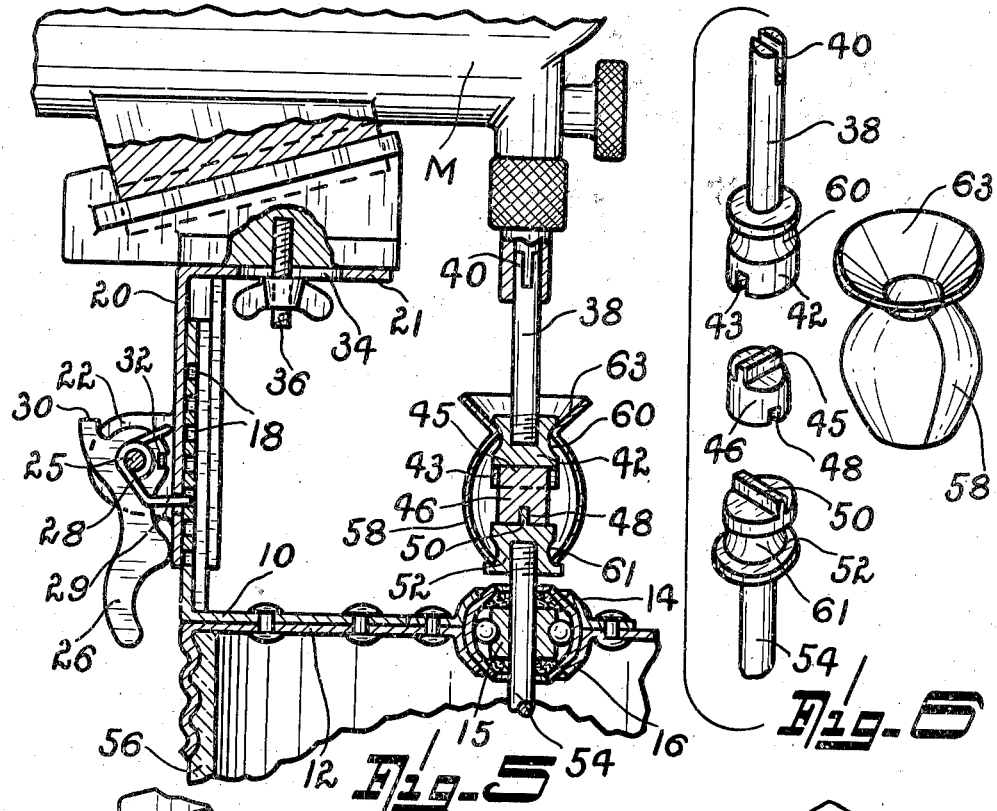
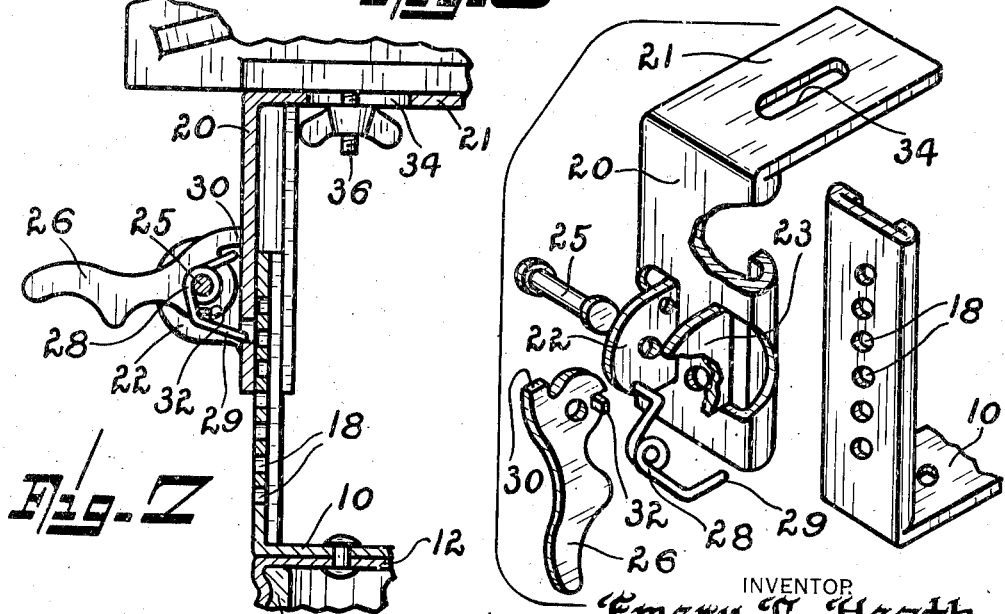
INVENTOR
Emery A. Heath
BY Smith & Tuck
ATTORNEYS Patented June 13, 1939

2,162,400

UNITED STATES PATENT OFFICE 2,162,400

REMOVABLE MOTOR MOUNT AND ADAPTER FOR MIXERS, CHURNS, AND THE LIKE

Emery A. Heath, Olympia, Wash.

Application August 26, 1936, Serial No. 98,043

2 Claims. (Cl. 248—16)

My present invention relates to the art of mixing, beating, or churning devices, and more particularly to a removable motor mount and adapter for mixers, churns, and the like.

With the increasing general use of kitchen mixers, employing a removable electric motor, there has developed an increasing need for a motor mount and adapting means which will make it possible to use the ordinary, commercial, kitchen mixer motor with the various mixing, beating, and particularly, churning devices. Power driven mixers, churns, and the like, have been produced for commercial or semi-commercial purposes. These do not fill the need of the average housewife, however, who must of necessity keep the investment in her kitchen equipment to a minimum. It, therefore, becomes necessary to provide additional adapter means and a satisfactory support so that these ordinary mixer motor units can be put to other uses in and about the household.

My present device is intended to serve this useful purpose. It consists of a mount and connecting means so arranged that, with small conversion members designed specifically to operate with certain types of commercial household mixers, it is now possible to adapt the mixer motor to additional, useful purposes at a minimum cost. Many problems must be overcome; one is that of providing a universal bracket which, with the minimum of conversion parts, will adapt the motor unit, and secure it to the mixing vessel in a manner so that it may be easily and quickly removed from the same, and be readily available for its designed use. A further requirement is to provide flexible drive means between the motor unit and the mixer. This is particularly desirable in the case of a churn, for instance, such as I have indicated in my present drawings.

The principal object of my present invention is, therefore, to provide a motor mount which is easily and quickly removable from the churn, or other mixing or beating vessel, leaving the motor in an unchanged condition ready for its normal use.

A further object of my invention is to provide the simplest of conversion parts so that the various types of commercial units may be adapted to this new purpose.

Another object of my present invention is to provide flexible, connecting means between the impeller of the churn, or mixing device and the mixer motor drive so that there will be no binding of parts which might seriously overload the light, high speed motors used in the average kitchen mixer.

A further object is to provide means whereby any leakage of oil, or grease, which quite often occurs with the kitchen mixers, will be arrested before it can find its way into the churn, or mixer, contaminating its contents.

Other and more specific objects will be apparent from the following description taken in connection with the accompanying drawings, wherein:

Figure 1 is an elevation showing a commercial kitchen mixer as adapted to a churn, certain parts being shown in section to better illustrate their construction.

Figures 2, 3, and 4 illustrate conversion units necessary to adapt various types of commercial motors to my motor bracket.

Figure 5 is an enlarged view of certain parts of Figure 1, the same being shown in section.

Figure 6 is an exploded view arrangement in which the four parts forming my flexible drive are shown in spaced relationship, bracketed together.

Figure 7 is a fragmentary view showing in part certain elements of Figure 5 but showing the motor portion of the bracket in its released position as would occur when the motor was being raised above the churn for the release of the drive means, or as would occur if it were desirable to entirely remove the motor unit as in charging, or emptying, the churn proper.

Figure 8 is an exploded view in perspective showing a number of associated parts forming my releasable bracket clamp in a single bracketed view.

Referring to the drawings, throughout which like reference characters indicate like parts, 10 designates the fixed motor support. This I prefer to form of sheet metal to the end that it may be pressed economically into the desired shape. It consists of a horizontal portion which is adapted to be riveted or otherwise secured to the metal top 12 of a churn and which, further, is formed in a partial spherical shape so as to form a housing 14 for the self-aligning ball bearing 15, the lower portion of this bearing support being formed by cover 12 which is pressed downwardly as at 16 to form the other portion of the bearing support. Bearing 15 should be provided with a partial, spherical part so that it may revolve slightly in seat 14 and 16 so as to accommodate itself to any reasonable misalignment and to serve as a self-aligning bearing to a degree sufficient for its present use. Member 10 has a vertically disposed portion which is pierced at intervals by holes 18. These are adapted to engage the selective locking means provided in the removable portion of my motor mount.

The removable portion of my motor mount also consists of an L-shaped member having the vertical portion 20 and the horizontal portion 21. This member is also preferably formed of sheet metal to the end that it too can be formed easily and will be light, strong, and durable. The vertical portion has formed from its body the two outwardly extending lug portions 22 and 23. These lugs are adapted to receive the pivot pin 25. Pivot pin 25 provides the support and axis of rotation for the locking lever 26 and the tortion spring 28, and end 29 of which serves as a locking means and is adapted to selectively engage holes 18 of member 10. Lever 26 is provided with a spring-engaging portion 30 and a transversely disposed lug 32 which engages a portion of spring 28 in a manner to remove tip 29 from engagement with holes 18, when the device is being adjusted, removed, or replaced. The horizontal portion of the removable bracket has an elongated slot 34 which is adapted to receive the positioning screw 36 of the various motor conversion parts permitting the motor unit to be rotated about a vertical axis so that either driving gear or power take off may be used, and is elongated so that accurate axial adjustment may be made to the end that the mixing element will not bind in the motor gearing causing undue heating or wear.

In Figures 2, 3, and 4, I have shown the conversion units which are normally adapted to receive motors of different makes of kitchen mixers. These conversion parts must be supplied to fit the particular motor used so that the necessary securing means will be provided which will accommodate the motor unit. Each of these conversion members is provided with a positioning screw 36 which in turn are adapted to engage slot 34. It has been found that by suitably positioning screws 36 and by having a reasonable extent to slot 34, the various types of kitchen mixer motors now known to the market can be accommodated by my bracket. In Figures 1 and 5 I have shown a type of motor M which uses the conversion unit shown in Figure 2. However, it is believed that it will be apparent that the forms shown in Figures 3 and 4, or any other suitable form can be used with equal facility.

Adapted for insertion into the power take-off barrel of the kitchen motor M is a second conversion member 38. This must have a deformed upper end 40 so arranged as to suitably engage the driving means in the particular motor used. Member 38 is provided at its lower end with a fixed female drive coupling member 42, having a slot at 43 adapted to engage a male driving member or key 45 formed as part of the intermediate coupling member 46. This member has disposed at right angles to the key 45 a key-way, or female engagement member, 48. Adapted to engage key-way 48, is a male key-portion 50 of coupling member 52. This coupling member is adapted to be fixedly secured to the drive-shaft 54 of any suitable type of mixer, beater, churning or stirring device, adapted for operative disposition in a mixing vessel as churn body 56. Adapted to enclose and secure in operative position the three members making up the flexible drive means is a spring housing member 58. This should be of sheet metal having such a temper as to be capable of sufficient distortion to slide over members 42, 46, and 52 and having slid over the same, to operatively engage in slots 60 and 61 in members 42 and 52, respectively, so as to hold the same in proper position and substantially in alignment.

In order to provide a means for catching any grease or oil that might drip out of the motor housing, I provide that the upper end of housing 58 flare outwardly as at 63 so as to provide a reservoir of limited extent to retain any oil that might otherwise run down shaft 38.

*Method of operation*

In using my device, assuming that the same is attached to a churn, the conversion member 38, adapted to the motor M, being used, is inserted into housing 58 so as to form the complete, flexible drive unit. The motor is then secured to that one of the conversion bases similar to those shown in Figures 2, 3, or 4 which is adaptable to the particular motor used. The removable portion of my bracket is then loosely secured to the conversion member by means of screw 36 and its associated wing nut. By lifting lever 26 to its upper position as shown in Figure 7 the device, together with the motor, is lowered upon the vertical portion of member 10 and shaft 38 entered into the desired power take-off from the motor. The removable bracket member is slid downwardly until the proper engagement is made with shaft 38 substantially after the showing of Figure 5. The locking lever 26 is then allowed to fall to its lower position as shown in Figure 5 which will insert tip 29 of spring 28 into the appropriate hole 18 in member 10. Final adjustment should then be made by moving the motor back and forth with reference to slot 34 until the point of most accurate alignment with shaft 54 is obtained. The wing nut can then be tightened and the device is ready for use.

When the contents have been mixed to the satisfaction of the operator the device may be disconnected by merely lifting up on lever 26 after the showing of Figure 7 and lifting the motor and removable bracket member entirely free from the churn. This will leave the conversion member 38 still connected with shaft 54. The churn can then be opened by unscrewing shaft 12 and the contents may be removed, or additional ingredients added.

The foregoing description and the accompanying drawings are believed to clearly disclose a preferred embodiment of my invention but it will be understood that this disclosure is merely illustrative and that such changes in the invention may be made as are fairly within the scope and spirit of the following claims.

Having thus fully described my invention, what I claim as new and desire to secure by Letters Patent is:

1. In a motor mount the combination with a standard having a longitudinal series of holes, an angular bracket having means for attaching one of its arms to the mount, and an opening in the other arm adapted to register with the holes in said series, of a lever pivoted on the second arm, a spring mounted at the pivotal support of the lever and having a free end forming a detent engaged in said opening and one of said holes, a head on the lever adapted to impinge against said second arm when the lever is swung as a handle in adjusting the bracket with relation to the standard, and means between the lever and the spring for releasing the latter from one of the series of holes when the lever is actuated.

2. In a motor mount the combination with a standard having a longitudinal series of holes, an angular bracket having means for attaching one of its arms to the motor mount, and an opening in the other arm adapted to register with the holes in said series, of a lever pivoted on the second arm, a spring mounted at the pivotal support of the lever and having a free end forming a detent engaged in said opening and one of said holes, a head on the lever adapted to impinge against said second arm when the lever is swung as a handle in adjusting the bracket with relation to the standard, and a lug on the lever spaced from the lever-head and adapted to engage the free end of the spring and remove said detent from one of the series of holes when the lever is actuated.

EMERY A. HEATH.